United States Patent
Nishida

(10) Patent No.: US 7,704,305 B2
(45) Date of Patent: Apr. 27, 2010

(54) HEAT EXCHANGE MODULE OF A SORPTIVE TYPE AND A METHOD FOR THE MANUFACTURE THEREOF

(75) Inventor: Ryosuke Nishida, Okayama (JP)

(73) Assignee: Japan Exlan Company Limited, Osaka (JP)

( * ) Notice: Subject to any disclaimer, the term of this patent is extended or adjusted under 35 U.S.C. 154(b) by 34 days.

(21) Appl. No.: 11/665,962

(22) PCT Filed: Aug. 22, 2005

(86) PCT No.: PCT/JP2005/015186

§ 371 (c)(1),
(2), (4) Date: Apr. 20, 2007

(87) PCT Pub. No.: WO2006/077672

PCT Pub. Date: Jul. 27, 2006

(65) Prior Publication Data

US 2008/0093059 A1    Apr. 24, 2008

(30) Foreign Application Priority Data

Jan. 21, 2005   (JP)   .............................. 2005-014882

(51) Int. Cl.
*F25B 17/08*    (2006.01)
*B01D 53/26*    (2006.01)

(52) U.S. Cl. ............................ 96/154; 62/271; 165/133

(58) Field of Classification Search .................. 96/154, 96/226; 62/94, 476, 271; 165/133
See application file for complete search history.

(56) References Cited

U.S. PATENT DOCUMENTS 5,308,703 A    5/1994    Tsujimoto et al. ........... 428/408

(Continued)

FOREIGN PATENT DOCUMENTS

DE    69108185 T2    6/1992

(Continued)

OTHER PUBLICATIONS

International Preliminary Report on Patentability, dated Dec. 2005.

(Continued)

*Primary Examiner*—Frank M Lawrence
(74) *Attorney, Agent, or Firm*—K&L Gates LLP

(57) ABSTRACT

As conventional heat exchange modules, adsorptive agents of an inorganic type such as silica gel, zeolite, active alumina, active carbon and molecular sieve have been used. While these adsorptive agents have characteristics of high moisture absorptive ability and easy handling, they have problems of durability, regenerating temperature and generation of bacteria or fungi. An object of the present invention is to solve these problems which are noted in the inorganic adsorptive agents and to provide a heat exchanger module of a energy conservation type having a high heat exchange efficiency and a method for the manufacture thereof. The present invention is a heat exchange module of a sorptive type, characterized in that, a moisture absorptive layer in which a sorptive agent of an organic polymer type comprising organic polymer having hydrophilic polar group and cross-linking structure in a molecule is an essential component, saturated moisture absorbing rates at 20° C. and 65% RH and 90% RH are not less than 20% by weight and not less than 40% by weight, respectively and the difference in the saturated moisture absorbing rates under such a condition is not less than 20% by weight is formed on a metal surface having excellent heat conductivity.

10 Claims, 2 Drawing Sheets

U.S. PATENT DOCUMENTS

| | | | |
|---|---|---|---|
| 6,228,506 B1 * | 5/2001 | Hosatte et al. | 428/537.5 |
| 6,562,754 B1 | 5/2003 | Inagaki et al. | 502/401 |
| 2004/0226698 A1 | 11/2004 | Reinders | 165/110 |

FOREIGN PATENT DOCUMENTS

| EP | 488287 A1 | 6/1992 |
|---|---|---|
| JP | 4-197441 | 7/1992 |
| JP | 05-322364 | 12/1993 |
| JP | 06-002984 | 1/1994 |
| JP | 08-271085 | 10/1996 |
| JP | 10-286460 | 10/1998 |
| JP | 2000-018767 | 1/2000 |
| JP | 2000-262892 | 9/2000 |
| JP | 2001-158981 | 6/2001 |
| JP | 2001-172547 | 6/2001 |
| JP | 2002-263566 | 9/2002 |
| JP | 2004-169240 | 6/2004 |
| JP | 2004-263959 | 9/2004 |
| WO | WO 03/082442 A1 | 10/2003 |

OTHER PUBLICATIONS

Supplementary European Search Report, dated May 2009.

* cited by examiner

[Fig. 1]
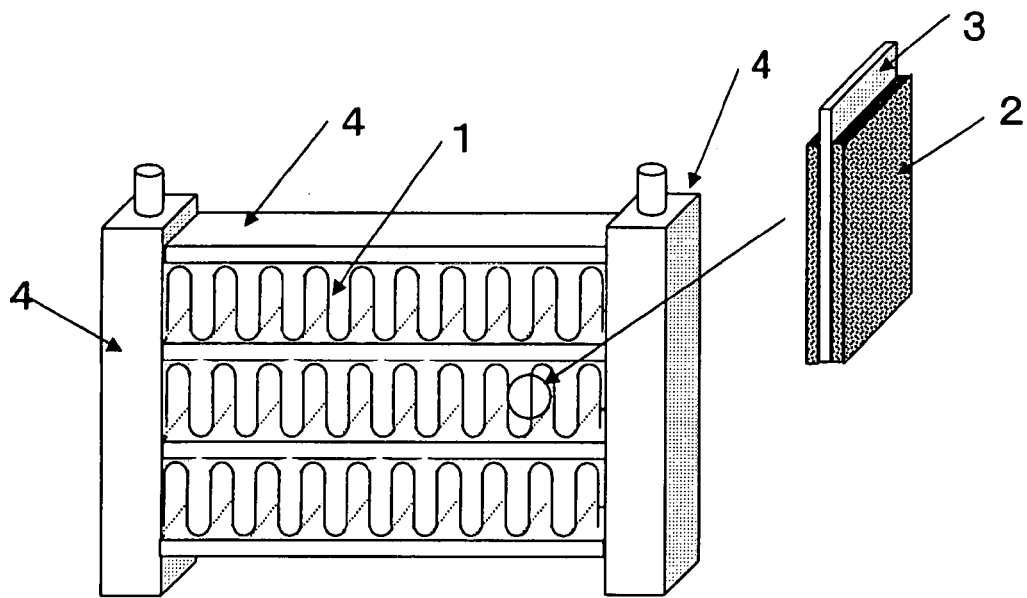
[Fig. 2]
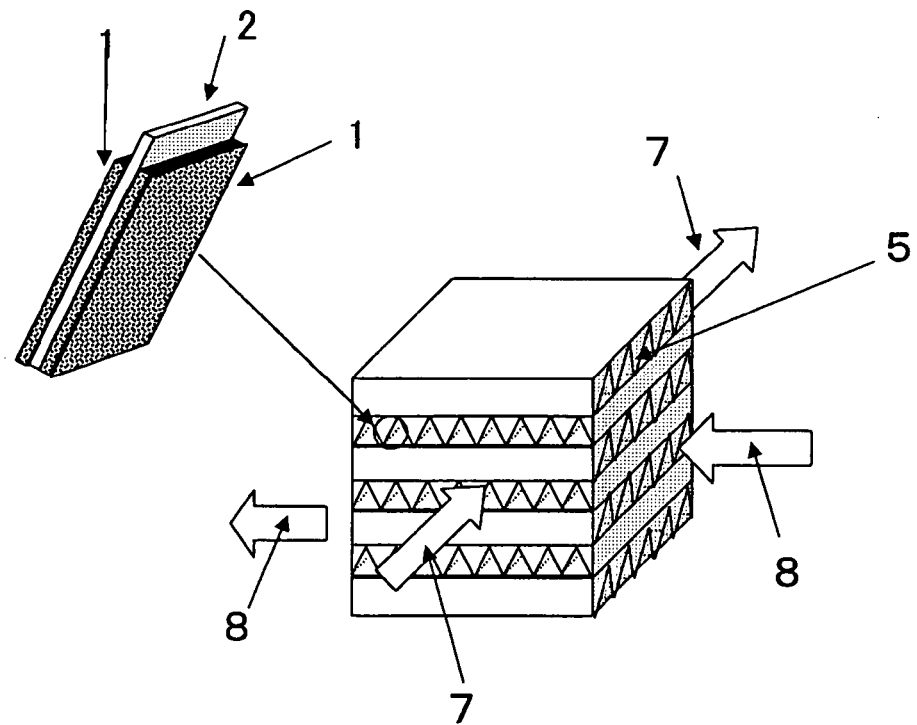

[Fig. 3]
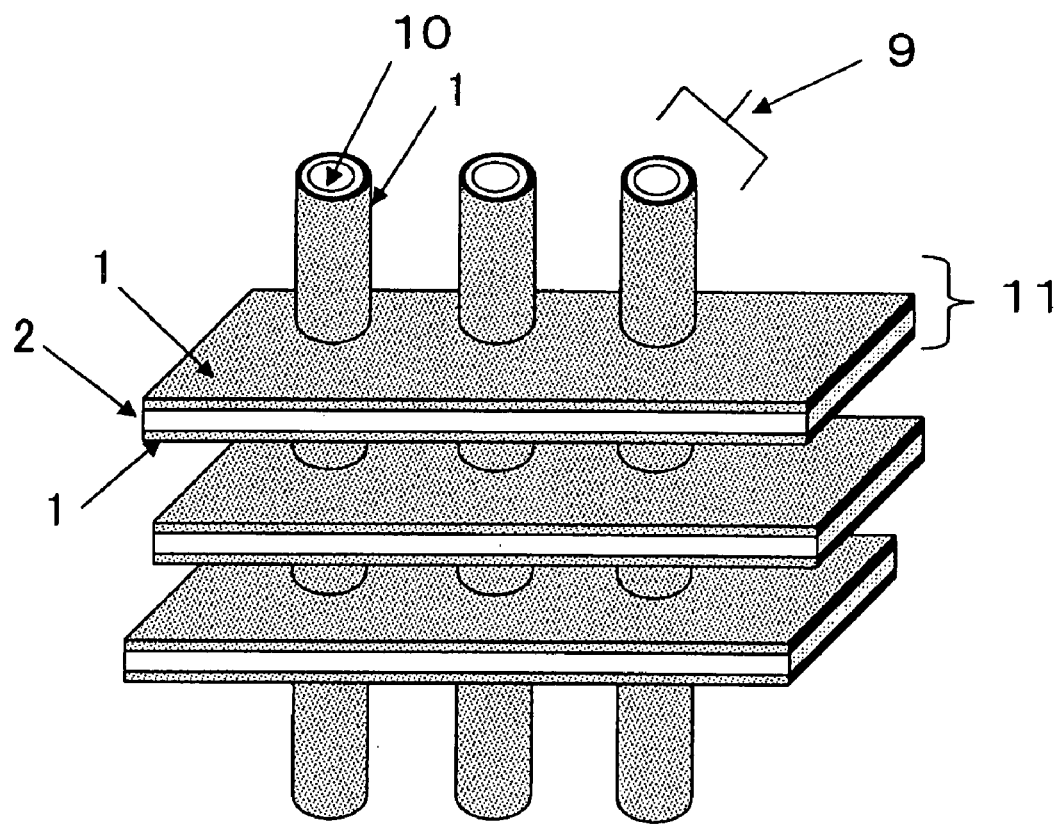

HEAT EXCHANGE MODULE OF A SORPTIVE TYPE AND A METHOD FOR THE MANUFACTURE THEREOF

CROSS-REFERENCES TO RELATED APPLICATIONS

This application claims the benefit of Japanese patent application 2005-014882, filed Jan. 21, 2005, herein incorporated by reference.

TECHNICAL FIELD OF THE INVENTION

The present invention relates to a sorptive heat exchange module in which humidity control is carried out by means of dehumidification and humidification by adsorption and desorption of water vapor using a sorptive agent of an organic polymer type and, at the same time, changes in sensible heat such as heat generation and cooling caused by such adsorption and desorption are utilized through metal, whereby heat exchange is carried out.

BACKGROUND ART

As shown in Japanese Patent Laid-Open No. 06/002,984, the conventional adsorptive heat exchange modules in adsorptive freezer, adsorptive air conditioner, etc. adopt such a system that many circular or polygonal metal plates are installed along the outer circumference of each of heat transfer pipes made of aluminum, copper, etc. to constitute fins and tubes and, in the gap of the fins, a solid adsorbent such as zeolite, silica gel or active carbon is filled. In such a constitution however, an area where the solid moisture absorber contacts to the fin is small and, therefore, there are many problems that conductive efficiency of heat is bad, that a filling state of the filled layer of the solid moisture absorber is affected as a result of moisture absorption and desorption and that spaces are generated between the solid moisture absorber and the fin or among the solid moisture absorbers whereby heat transfer efficiency lowers.

In order to solve those problems, there have been proposals such as a method where a solid moisture absorber such as silica gel or zeolite is applied onto a heat exchange surface (Japanese Patent Laid-Open No. 05/322,364); and a method where an adsorbent such as active alumina, active carbon, zeolite or molecular sieve is adhered to a metal fin using a powdery adhesive of a thermo-setting type or a powdery adhesive of a thermoplastic type (Japanese Patent Laid-Open No. 2000/018,767). Further, there have been shown examples such as a method where, in order to enhance the heat exchange efficiency between adsorbent and metal surface, a spherical adsorbent such as zeolite, silica gel or active alumina is installed onto a heat exchange surface via a heat conductive layer part (Japanese Patent Laid-Open No. 08/271,085); an adsorbent where graphite is added, in order to enhance the heat conductivity, to silica gel acting as an adsorbent and an adsorptive heat exchanger using the same (Japanese Patent Laid-Open No. 10/286,460); and an example where graphite and silicon carbide are added to an adhesive resin (Japanese Patent Laid-Open No. 2004/263,959).

As mentioned above, as to moisture absorbers which have been used as conventional heat exchange modules, those of an inorganic type such as silica gel, zeolite, active alumina, active carbon and molecular sieve have been used. Mechanism of adsorption by those adsorptive agents is due to adsorption of water molecules with surfaces of pores of each of inorganic adsorptive agents and there are characteristics that moisture absorptive ability is high and that handling as particles is easy.

However, any of those adsorptive agents is an inorganic substance and, therefore, there is a problem that, it is hard and, when moisture absorption and desorption are repeated for a long period, there occurs a phenomenon in which the adsorptive agent is cracked due to a slight change in volume accompanied by moisture absorption and desorption or is crushed or pulverized resulting in a lowering of property. In addition, all of those inorganic adsorptive agents are strongly bonded to water molecules and, therefore, although the adsorption takes place strongly, big energy is needed for cleaving the bond upon desorption or, in other words, high temperature is needed for regeneration whereby that is not preferred in view of conversation of energy.

Further, in the case of such an inorganic substance, since it is porous and is apt to become a state where moisture is abundant, bacteria or fungi are apt to grow and there are some cases where, due to them, dust causing damage of health or abnormal smell is generated whereby problems happen.

DISCLOSURE OF THE INVENTION

Problems that the Invention is to Solve

An object of the present invention is to solve the problems of durability, problems of regenerating temperature, problems of bacteria or fungi, etc. which are noted in the above inorganic adsorptive agents and to provide a heat exchanger module of a energy conservation type having a high heat exchange efficiency.

Means for Solving the Problems

The above-mentioned object of the present invention is able to be achieved by the following means. Thus,

[1] A heat exchange module of a sorptive type, characterized in that, a moisture absorptive layer in which a sorptive agent of an organic polymer type comprising organic polymer having hydrophilic polar group and cross-linking structure in a molecule is an essential component, saturated moisture absorbing rates at 20° C. and 65% RH and 90% RH are not less than 20% by weight and not less than 40% by weight, respectively and the difference in the saturated moisture absorbing rates under such a condition is not less than 20% by weight is formed on a metal surface having excellent heat conductivity.

[2] The heat exchange module of a sorptive type according to [1], wherein the sorptive agent of an organic polymer type contains 1.0 to 10.0 meq/g of carboxyl group of a salt type as the hydrophilic polar group contained in a molecule, has an antibacterial and/or an antifungal property/properties and water absorbing multiplication factor of the moisture absorptive layer where said sorptive agent of an organic polymer type is an essential component is not more than 10-fold.

[3] The heat exchange module of a sorptive type according to [1] or [2], wherein the salt of the carboxyl group of a salt type is a potassium type.

[4] The heat exchange module of a sorptive type according to any of [1] to [3], wherein the sorptive agent of an organic polymer type is in fine particles and average particle diameter of primary particles of said fine particles is smaller than 5 μm.

[5] The heat exchange module of a sorptive type according to any of [1] to [4], wherein the rate of a sorptive agent of an organic polymer type in the moisture absorptive layer is not less than 70% by weight.

[6] The heat exchange module of a sorptive type according to any of [1] to [5], wherein the moisture absorptive layer where the sorptive agent of an organic polymer type is an essential component has a porous structure.

[7] The heat exchange module of a sorptive type according to any of [1] to [6], wherein the moisture absorptive layer is able to be regenerated at the temperature of lower than 100° C.

[8] The heat exchange module of a sorptive type according to any of [1] to [7], wherein the metal having excellent heat conductivity is any of aluminum, copper, aluminum alloy and copper alloy.

[9] The heat exchange module of a sorptive type according to any of [1] to [8], wherein the moisture absorptive layer where a sorptive agent of an organic polymer type is an essential component is prepared by means of cross-linking using any of a cross-linking agent selected from a group consisting of melamine resin, urea resin, phenol resin, polyepoxy resin, blocked polyisocyanate compound, aziridine compound, compound containing a polyoxazoline group, titanium chelate compound and zirconia compound.

[10] The heat exchange module of a sorptive type according to any of [1] to [9], wherein the metal having excellent heat conductivity is that which is treated with a silane coupling agent or a titanate coupling agent.

[11] A method for the manufacture of a heat exchange module of a sorptive type, characterized in that, a metal having excellent thermal conductivity is coated with or impregnated with a solution containing a sorptive agent of an organic polymer type and heated and dried after an excessive solution is removed whereby a moisture absorptive layer is formed on the surface of said metal.

[12] A method for the manufacture of a heat exchange module of a sorptive type, characterized in that, a metal to be coated having excellent heat conductivity is coated with or impregnated with a solution containing a monomer which is able to be converted to a sorptive agent of an organic polymer type by polymerization and heated and dried whereby a moisture absorptive layer where a sorptive agent of an organic polymer type is an essential component is formed on the surface of said metal.

Advantages of the Invention

The heat exchange module of a sorptive type according to the present invention adopts a polymer of a specific organic type having a soft structure as an essential component for the moisture absorptive layer and, therefore, even if swelling and shrinking take place due to moisture absorption and desorption, it is possible to follow the volume change due to them and there is no problem of crashing and pulverization since the change is absorbed whereby excellent durability is able to be achieved for a long period. In addition, regeneration after absorption of moisture is possible at the temperature of as low as below 100° C. and, therefore, it is able to be used for various uses as a heat exchange module of a sorptive type in an energy conservation mode having a high heat exchange efficiency.

BRIEF DESCRIPTION OF THE DRAWINGS

FIG. 1 shows a heat exchange module of a sorptive type having a wave-shaped fin where a moisture absorptive layer comprising a sorptive agent of an organic polymer type is formed on both sides.

FIG. 2 shows a heat exchange module of a sorptive type having corrugate fin where a moisture absorptive layer comprising a sorptive agent of an organic polymer type is formed on both sides and aluminum corrugate which intersects therewith at right angles.

FIG. 3 shows a schematic drawing of a heat exchange module of a sorptive type comprising heat transmitting tube and fins which lie at right angles thereto and are arranged at equal intervals and in parallel.

EXPLANATION OF REFERENCE SIGNS IN DRAWINGS

1 wave-shaped fin where a moisture absorptive layer comprising a sorptive agent of an organic polymer type is formed

2 moisture absorptive layer comprising a sorptive agent of an organic polymer type

3 aluminum fin

4 tube in which a heat exchange fluid flows

5 corrugated molded aluminum plate layer for exchange of sensible heat

6 corrugated molded aluminum plate layer where moisture absorptive layer for latent heat exchange and moisture absorption and desorption is formed

7 air flow for latent heat exchange

8 air flow for sensible heat exchange

9 heat transfer copper tube where a moisture absorptive layer comprising a sorptive agent of an organic polymer type is formed

10 heat transfer copper tube

11 aluminum film where a moisture absorptive layer comprising a sorptive agent of an organic polymer type is formed

BEST MODE FOR CARRYING OUT THE INVENTION

In the heat exchange module of a sorptive type according to the present invention, a moisture absorptive layer in which saturated moisture absorbing rates at 20° C. and 65% RH and 90% RH are not less than 20% by weight and not less than 40% by weight, respectively and the difference in the saturated moisture absorbing rates under such a condition is not less than 20% by weight is formed on a metal surface having excellent heat conductivity and, in said moisture absorptive layer, a sorptive agent of an organic polymer type comprising hydrophilic polar group and cross-linking structure in a molecule is adopted as an essential component thereof.

The sorptive agent of an organic polymer type adopted by the present invention is a material where an organic polymer main chain having hydrophilic polar group in a molecule is made into a three dimensional structure by a cross-linking structure and it is a material which sorbs much amount of water vapor due to a sorptive phenomenon. A phenomenon in a system of gas and solid where gas concentration in a solid phase is higher than that in a gas phase at the interface of both is called adsorption while a phenomenon therein where adsorbed gas molecular comes into the inner part of the solid via surface layer of the solid is called absorption and a phenomenon in which the adsorption and the absorption take place at the same time is called a sorptive phenomenon. Thus, when gaseous water molecule (water vapor) acts on a sorptive agent of an organic polymer type, water is adsorbed by a highly hydrophilic polar group of said sorptive agent and is absorbed by further coming into a molecule of the sorptive agent. There is an appropriate softness in the three-dimensional structure of the sorptive agent of an organic polymer type adopted by the present invention whereby it is at that time possible to be swollen upon absorption of water molecules and abundant water molecules are able to be incorporated into said sorptive agent while, as the water molecules are discharged, shrinking takes place whereby it is possible to return to the original structure being able to give an excellent durability.

Examples of the hydrophilic polar group in the molecule are carboxyl group, sulfonic acid group, phosphoric acid group, sulfuric acid group, primary amino group, secondary amino group, tertiary amino group, quaternary amino group and their chloride compounds or nitro group, aldehyde group, amide group, nitrile group, mercapto group and hydroxyl group. Among them, carboxyl group, sulfonic acid group, phosphoric acid group and sulfuric acid group are preferred and, particularly in the case of a carboxyl group of a salt type, moisture absorptive ability is very high whereby a sorptive heat exchange module with excellent properties is able to be resulted.

With regard to a salt which constitutes a salt compound of an anionic group such as the above-mentioned carboxyl group, sulfonic acid group, phosphoric acid group, sulfuric acid group, etc., there is no particular limitation so far as it is able to form a salt structure with each anionic group and examples thereof are alkali metal such as Li, Na, K, Rb and Cs; alkali earth metal such as Be, Mg, Ca, Sr and Ba; other metal such as Cu, Zn, Al, Mn, Ag, Fe, Co and Ni; and organic cation such as $NH_4$ and amine. Among them, K is more preferred which is particularly effective for enhancement of moisture absorptive and desorptive speeds in the case of salt-type carboxyl group. It is also possible to use two or more of the above salts at the same time.

More detailed illustration will be made now for the case of a salt-type carboxyl group which gives particularly favorable result. A salt-type carboxyl group is a polar group having high hydrophilicity which is appropriate for expressing the moisture absorbing property and, when high moisture absorptive ability is to be achieved, it is preferred to contain the salt-type carboxyl groups as much as possible. However, in order to achieve durability or a high moisture absorptive speed together with moisture absorptive amount, it is necessary to be in an appropriate balance in terms of a rate to the cross-linking structure of the sorptive agent of an organic polymer type according to the present invention. To be more specific, when the amount of the salt-type carboxyl group is too much or, in other words, when it is more than 10.0 meq/g, the rate of the cross-linking structure which is able to be introduced becomes too small resulting in a thing which is near the so-called highly water-absorptive resin whereby there may be resulted problems such as that moisture absorbing ability becomes low, that size stability becomes inferior giving no sufficient durability and that tackiness is generated. Due to the above-mentioned viewpoint, amount of the salt-type carboxylic group giving more preferred result is not more than 9.0 meq/g.

On the contrary, when amount of the salt-type carboxyl group is small, the moisture absorbing property lowers and, particularly when the amount is less than 1.0 meq/g, the resulting moisture absorbing property is inferior even to the above-mentioned inorganic-type sorptive agent whereby its utilizable area as a sorptive heat exchange module is limited. When amount of the salt-type carboxyl group is 3.0 meq/g or more, priority of the moisture absorbing ability is significant as compared with other currently-available moisture absorbing materials giving far better result.

There is no particular limitation for a method of introducing the salt-type carboxyl group and examples thereof are a method where a polymer is prepared by subjecting a monomer having a salt-type carboxyl group to a homopolymerization or to a copolymerization with other copolymerizable monomer (method 1); a method where, after preparing a polymer having a carboxyl group, it is converted into a salt type (method 2); a method where a monomer having a functional group which is able to be introduced into a carboxyl group is polymerized and said functional group in the resulting polymer is converted to a carboxyl group by means of chemical modification and then further converted to a salt type (method 3); a method where the above-mentioned three methods were carried out by means of graft polymerization; etc.

Examples of the above method 1 where a monomer having a salt-type carboxyl group is polymerized are a method where a salt-type monomer corresponding to a monomer having a carboxyl group such as acrylic acid, methacrylic acid, maleic acid, itaconic acid or vinylpropionic acid is solely polymerized, two or more of those monomers are polymerized or its mixture with a salt-type one corresponding to the carboxylic acid type being the same species is polymerized and a method where such a monomer is copolymerized with other polymer which is copolymerizable therewith.

Example of the method 2 where, after preparing a polymer having a carboxyl group, it is converted into a salt type is a method where a homopolymer of an acid-type monomer having the above-mentioned carboxyl group, a copolymer comprising two or more kinds of said monomers or a copolymer with other copolymerizable monomer is prepared followed by converting to a salt type. There is no particular limitation for a method of converting the carboxyl group into a salt type and the conversion may be carried out by, for example, a method where the above-prepared acid-type polymer is made to act with a solution containing alkali metal ion such as Li, Na, K, Rb and Cs, alkali earth metal ion such as Be, Mg, Ca, Sr and Ba, other metal ion such as Cu, Zn, Al, Mn, Ag, Fe, Co and Ni or organic cation such as $NH_4$ and amine compound to conduct ion exchange.

With regard to method 3 where carboxyl group is introduced by chemical modification, there is a method, for example, where a homopolymer of a monomer having a functional group which is able to be modified to carboxyl group by chemical modification, a copolymer comprising two or more kinds thereof or a copolymer with other monomer which is able to be copolymerized is polymerized and the resulting polymer is hydrolyzed to modify to carboxyl group and, when the resulting state is not a salt type, the above method of making into a salt type is applied to the modified carboxyl group. Examples of the monomer to which such a method is able to be applied are a monomer having nitrile group such as acrylonitrile and methacrylonitrile; and anhydride, ester derivative, amide derivative, ester derivative having a cross-linking property, etc. of a monomer having carboxylic acid group such as acrylic acid, methacrylic acid, maleic acid, itaconic acid and vinylpropionic acid.

Examples of the anhydride of a monomer having carboxylic acid group are maleic acid anhydride, acrylic acid anhydride, methacrylic acid anhydride, itaconic acid anhydride, phthalic acid anhydride, N-phenylmaleimide and N-cyclomaleimide.

Examples of the ester derivative of a monomer having carboxylic acid group are an alkyl ester derivative such as methyl, ethyl, propyl, butyl, pentyl, hexyl, heptyl, octyl, lauryl, pentadecyl, cetyl, stearyl, behenyl, 2-ethylhexyl, isodecyl and isoamyl; an alkyl ether ester derivative such as mehthoxyethylene glycol, ethoxyethylene glycol, mehtoxypolyethylene glycol, ethoxypolyethylene glycol, polyethylene glycol, methoxypropylene glycol, propylene glycol, methoxypolypropylene glycol, polypropylene glycol, methoxypolytetraethylene glycol, polytetraethylene glycol, polyethylene glycol-polypropylene glycol, polyethylene glycol-polytetraethylene glycol, polypropylene glycol-polytetraethylene glycol and butoxyethyl; a cyclic compound ester derivative such as cyclohexyl, tetrahydrofurfuryl, benzyl, phenoxyethyl, phenoxypolyethylene glycol, isobonyl and neopentyl glycol benzoate; a hydroxyalkyl ester derivative such as hydroxyethyl, hydroxypropyl, hydroxybutyl, hydroxyphenoxypropyl, hydroxypropylphthaloylethyl and chloro-hydroxypropyl; an aminoalkyl ester derivative such as dimethylaminoethyl, diethylaminoethyl and trimethylaminoethyl; an alkyl carboxylate derivative such as (meth)acryloyloxyethyl succinate and (meth)acryloyloxyethyl hexahydrophthalate; an alkyl ester derivative containing phosphoric acid group or phosphate group such as (meth) acryloyloxyethyl acid phosphate;

a cross-linking alkyl ester such as ethylene glycol di(meth)acrylate, polyethylene glycol di(meth)acrylate, 1,4-butanediol di(meth)acrylate, 1,3-butanediol di(meth)acrylate, 1,6-hexanediol (meth)acrylate, 1,9-nonanediol di(meth)acrylate, trimethylolpropane tri(meth)acrylate, pentaerythritol tetra (meth)acrylate, dipentaerythritol hexa(meth)acrylate, glycerol dimethacrylate, 2-hydroxy-3-acryloyloxypropyl (meth) acrylate, bisphenol A ethylene oxide adduct di(meth)acrylate, bisphenol A propylene oxide adduct di(meth)acrylate, neopentyl glycol di(meth)acrylate, 1,10-decanediol di(meth) acrylate, dimethyloltricyclodecane di(meth)acrylate and ethylene oxide-modified trimethylolpropane tri(meth)acrylate; and a fluorinated alkyl ester derivative such as trifluoroethyl, tetrafluoropropyl, hexafluorobutyl and perfluorooctylethyl.

Examples of the amide derivative of a monomer having carboxylic acid group are an amide compound such as (meth) acrylamide, dimethyl (meth)acrylamide, monoethyl (meth) acrylamide and normal-tertiary-butyl (meth) acrylamide; etc. With regard to other method for introducing carboxyl group by chemical modification, oxidation of alkene, alkyl halide, alcohol, aldehyde, etc. may be also exemplified.

With regard to a method of introducing a salt-type carboxyl group by a hydrolyzing reaction of a polymer in the above method 3, there is also no particular limitation but the already-known hydrolyzing conditions may be utilized. Examples thereof are a method where a salt-type carboxyl group is introduced using a basic aqueous solution such as alkali metal hydroxide (e.g., sodium hydroxide, lithium hydroxide and potassium hydroxide) and ammonia into a polymer which is cross-linked by polymerization of the above monomer and a method where reaction with a mineral acid such as nitric acid, sulfuric acid or hydrochloric acid or an organic acid such as formic acid or acetic acid is carried out to form carboxylic acid group followed by mixing with alkali metal salt whereby a salt-type carboxyl group is introduced by means of ion exchange. Among them, the preferred one is a hydrolyzing method using potassium hydroxide whereby carboxyl group of a potassium salt type having an excellent moisture absorbing speed is easily prepared. With regard to the condition for giving 1.0 to 10.0 meq/g, it will be able to be decided by making the relation between the reaction factor such as reaction temperature, concentration and time and the amount of a salt-type carboxyl group to be introduced clear by means of experiments.

In the present invention, it is essential that the sorptive agent of an organic polymer type has a cross-linking structure for achieving a high moisture absorbing ability and for maintaining the dimensional stability upon absorption of moisture so as to achieve the durability. There is no particular limitation for the cross-linking structure so far as the structure does not affect the moisture absorptive and desorptive properties and the property of the product whereby the above properties were utilized and any of the structures such as cross-link by covalent bond, ionic cross-link and cross-link by interaction among polymer molecules or crystalline structure may be acceptable. There is also no particular limitation for a method of introducing the cross-link and its examples are a method of introducing cross-link where a cross-linking monomer is copolymerized during the polymerizing stage of the already-mentioned monomer used and an after-cross-linking method where the already-mentioned monomer is once polymerized and, after that, cross-linking structure is introduced by chemical reaction or by physical energy. Among them, a strong cross-link by a covalent bond is able to be introduced by a method where a cross-linking monomer is used during the polymerizing stage of the monomer or by a method where chemical after-cross-linking is conducted after obtaining a polymer and physical and chemical modifications due to moisture absorption and moisture desorption are hardly resulted whereby they are preferred.

Particularly in the case of a sorptive agent of an organic polymer type having a salt-type carboxyl group in a method where a cross-linking monomer is used during the polymerizing stage of a monomer, it is possible to prepare a cross-linked polymer having a cross-linking structure based on a covalent bond when a cross-linking monomer having the already-mentioned carboxyl group or being able to copolymerized with a monomer which is able to be converted to carboxyl group is used and subjected to copolymerization. In that case however, it is necessary to be a cross-linking monomer which is not affected or is hardly affected by an acidic condition shown by acrylic acid or the like which is a monomer or by chemical influence (such as hydrolysis) upon converting to a carboxyl group in the polymer.

There is no particular limitation for a cross-linking monomer which is able to be used for a method where a cross-linking monomer is used during the polymerizing stage of a monomer and its examples are cross-linking vinyl compounds such as glycidyl methacrylate, N-methylolacrylamide, triallyl isocyanurate, triallyl cyanurate, divinylbenzene, hydroxyethyl methacrylate, diethylene glycol di(meth)acrylate, triethylene glycol di(meth)acrylate, trimethylolpropane tri(meth)acrylate and methylenebisacrylamide. Among them, the cross-linking structure by triallyl isocyanurate, triallylcyanurate, divinylbenzene and methylenebisacrylamide is preferred because it is chemically stable even in hydrolysis for introduction of carboxyl group applied to the cross-linking polymer containing the same.

There is also no particular limitation for the method by means of after-cross-linking and its example is an after-cross-linking method where nitrile group contained in a nitrile-type polymer where amount of vinyl monomer having a nitrile group is not less than 50% by weight is made to react with a hydrazine-type compound or formaldehyde. Particularly, the cross-linking structure introduced by a hydrazine-type compound is stable against acid and alkali and, further since the resulting cross-linking structure itself is hydrophilic, that is able to contribute in improvement of moisture absorbing property. Moreover, it is very good in such a respect that a strong cross-link which is able to maintain the shape of porous substance, etc. bestowed to the polymer can be introduced. With regard to a cross-linking structure obtained by said reaction, although its details are not identified, it is presumed to be due to a triazole ring or a tetrazole ring structure.

There is no particular limitation for the vinyl monomer having nitrile group so far as it contains nitrile group and its specific examples are acrylonitrile, methacrylonitrile, ethacrylonitrile, α-chloroacrylonitrile, α-fluoroacrylonitrile and vinylidene cyanide. Among them, acrylonitrile which is advantageous in terms of cost and has much nitrile amount per unit weight is most preferred.

There is no particular limitation for the method where cross-link is introduced by the reaction with a hydrazine-type compound so far as the aimed cross-linking structure is prepared and that is able to be appropriately selected depending, if necessary, upon concentrations of the acrylonitrile-type polymer and the hydrazine-type compound upon the reaction, solvent used, reaction time, reaction temperature, etc. With regard to the reaction temperature among them, there may be a problem that reaction speed becomes slow and reaction time becomes too long if the temperature is too low while, if the temperature is too high, plasticization of the material acrylonitrile-type polymer takes place and the form bestowed on the polymer is destructed. Accordingly, the reaction temperature is preferably 50 to 150° C. and, more preferably, 80° C. to 120° C. There is also no particular limitation for the part of the acrylonitrile-type polymer which is made to react with the hydrazine-type compound but the polymer is able to be appropriately selected depending upon the use and form of said polymer. To be more specific, it is able to be appropriately selected in such a view that, for example, reaction is done only with the surface of said polymer, reaction is done to the core as a whole or reaction is done by limiting a specific part. Examples of the hydrazine-type compound used here are a hydrazine salt such as hydrazine hydrate, hydrazine sulfate, hydrazine hydrochloride, hydrazine nitrate, hydrazine hydrobromide and hydrazine carbonate and a hydrazine derivative such as ethylenediamine, guanidine sulfate, guanidine hydrochloride, guanidine nitrate, guanidine phosphate and melamine.

In order to prepare a sorptive heat exchange module of the present invention having excellent moisture absorbing an desorbing properties, it is necessary that a saturated moisture absorbing rate of the moisture absorptive layer formed on the metal surface under the conditions of 20° C. at 65% RH (relative humidity) and 90% RH are not less than 20% by weight and 40% by weight, respectively and that the difference in the saturated moisture absorbing rates under such a condition is not less than 20% by weight and preferably not less than 30% by weight. When the saturated moisture absorbing rates under those relative humidities are less than 20% by weight and 40% by weight, respectively, the resulting basic property is that the moisture absorbing ability is low and, when the difference in the saturated moisture absorbing rates is less than 20% by weight, the moisture desorbing property becomes inferior whereby an object of the present invention is unable to be achieved. Incidentally, the term of saturated moisture absorbing rate used here is the value obtained by such a manner that a sample is absolutely dried and allowed to stand under a constant temperature and humidity until a saturated state is resulted and amount of the absorbed moisture is determined from the change in weights before and after that and is divided by the absolutely dried weight of the sample.

The sorptive agent of an organic polymer type used in the present invention has solved those problems and is characterized in that it has high moisture absorptive and desorptive properties and that the moisture absorptive layer where the sorptive agent of the organic polymer type as such is an essential component has a high dimensional stability. With regard to this dimensional stability, one index therefor is that the water absorbing multiplication factor upon absorption of water is preferred to be not more than 10-fold and, more preferably, not more than 5-fold. The water absorbing multiplication factor used here is the value calculated by such a manner that a sample in an absolutely dried state is dipped in water so that water is absorbed therewith until a saturated state and amount of water absorbed therewith is calculated from the change in the weight before and after that and divided by the weight of the sample in a dried state. When the water absorbing multiplication factor is more than 10-fold, there is a problem that swelling upon absorption of moisture becomes large or that big swelling is resulted in case water due to dew condensation acts thereon whereby exfoliation from metal is resulted and that is not preferred.

With regard to the form of the sorptive agent of an organic polymer type used in the present invention, there is no particular limitation but that which meets each use may be appropriately selected and that in fine particles is able to give a particularly good result. The sorptive agent of an organic polymer type in fine particles as such has a big specific surface area because of the fine particles whereby moisture absorbing and desorbing speeds are able to be enhanced. In a moisture absorptive layer where fine particles are layered, slight gaps are generated at the site where the particles are layered but, since changes in volume such as swelling and shrinking of the sorptive agent as a result of moisture absorption and desorption are able to be compensated by the gaps, the above contributes in improvement of durability. In addition, as a result of the presence of such a gap, there are advantages that transfer of water vapor is apt to take place whereby moisture absorbing and desorbing speeds are able to be enhanced and that, at the same time, water vapor is able to reach the deep area of the moisture absorptive layer whereby the moisture absorptive layer is able to be fully used.

There is no particular limitation for the particle diameter of the sorptive agent of an organic polymer type in fine particles so far as it is possible to be processed as a sorptive heat exchange module and aimed properties are achieved. It is however preferred that an average primary particle diameter of said fine particles is not more than 5 μm from the viewpoints that the moisture absorbing and desorbing speeds are enhanced and durability as a moisture absorptive layer is enhanced. It is more preferred to be not more than 0.2 μm where specific surface area becomes very big and moisture absorbing and desorbing speeds are significantly improved. The average primary particle diameter used here stands for a mean value of particle diameters in a state where the fine particles are not associated or aggregated (primary particles). When said fine particles are finely dispersed or are present in a form of emulsion in a solvent such as water, they are completely dispersed in a solvent such as water and the value measured as average particle diameter therefor is used. In the case where the primary particles are aggregated, they are observed under an electron microscope or the like in an enlarged state and size of each primary particle forming a block is measured.

When the particle diameter is larger than 5 μm, (1) specific surface area becomes small whereby the adsorbed amount on the surface extremely contributing in improvement of moisture absorbing speed lowers and (2) radius becomes big whereby time for transfer of water molecules to the center of the particle becomes long. As a result, water molecules are unable to reach the central part of the particle within very short time and the central part does not contribute in the moisture absorbing speed and, accordingly, there are some cases where the inherent moisture absorbing ability is not fully achieved.

There is also no particular limitation for the shape of the particles and any of the forms of sphere, amorphous, plate, die, spindle, column, etc. may be used. There is no particular limitation for the form thereof as well and the particles where surface is flat and surface has unevenness and those in an porous form, in an aggregate form of primary particles, etc. may be appropriately selected and used.

There is no particular limitation for the rate of the sorptive agent of an organic polymer type in the moisture absorptive layer and it may be appropriately set so that the aimed properties are able to be expressed. However, in view of preparing a sorptive heat exchange module having a high efficiency, the rate of the fine particles of said sorptive agent in the moisture absorptive layer is preferred to be not less than 70% by weight. When the rate is less than 70% by weight, there may some cases where no moisture absorbing and desorbing property is achieved or moisture absorbing and desorbing speeds lower. More preferably, it is not less than 80% by weight.

The sorptive agent of an organic polymer type used in the present invention is preferred to have antibacterial and/or antifungal property/properties. Since the sorptive agent maintains moisture, there are some cases where bacteria or fungi are generated. Especially in the case of an adsorptive agent of an inorganic type which has been used in the conventional adsorptive heat exchange module, there is a problem as mentioned already that offensive smell and dust affecting the health are generated due to generation of bacteria or fungi. However, the sorptive agent of an organic polymer type adopted by the present invention itself has antibacterial and/or antifungal property/properties and it has a characteristic feature that no such a problem happens.

Although there is no particular limitation for the form of the moisture absorptive layer which is formed on the metal surface according to the present invention, it is preferred to be in a porous structure for improving the moisture absorbing and desorbing speeds. Although there is also no particular limitation for the state of the porous structure, the case having macropores where a specific surface area is not less than 1 $m^2/g$ and an average pore diameter is 0.005 to 5.0 μm often gives a good result. The specific surface area used here is a value which is measured by a one-point method among BET method which is a physical adsorption method. The average pore diameter is a value calculated by a formula $4V/S$ from specific surface area (S) and pore volume (V) per unit mass determined from pore size distribution measured by a mercury intrusion porosimetry.

With regard to the specific surface area, there is a tendency that the more the area, the quicker the moisture absorbing speed although it is not true that just big cases always result in a product having an excellent moisture absorbing speed. Thus, even when the specific surface area is big, the pores per se disturb the diffusion of water molecules if an average pore diameter is very small and, as a result, there may be the case where the moisture absorbing speed becomes low. Accordingly, with regard to the moisture absorbing speed, it is important that the above-mentioned specific surface area and average pore diameter are well balanced. In such a sense, the case having the above-mentioned specific surface area and having macropores where average pore diameter is 0.005 to 5.0 μm is preferred.

When the average pore diameter is less than 0.005 μm, the pore is too small, space where water molecules diffuse decreases and moisture absorbing speed lowers. At last, a Knudsen diffusion region is resulted whereby diffusion speed of water molecules significantly decreases and no satisfactory moisture absorbing speed is achieved. On the contrary, when it is more than 5.0 μm, pores of the polymer per se become too big resulting in spaces only whereby problems such as that the ratio as a moisture absorbing material becomes small, moisture absorbing amount per unit volume lowers and practical value lowers are resulted.

There is also no particular limitation for a method of introducing the above-mentioned porous structure and any of conventional methods for forming a porous structure may be appropriately adopted. They are, for example, a method where foaming agent is added in forming a moisture absorptive layer on metal surface to open pores by foaming; a method where a gelling agent is added and porous substance is formed by the means accompanied by gelling in forming the moisture absorptive layer; a method where a sorptive agent of an organic polymer type in fine particles is roughly filled in forming the moisture absorptive layer; a method where a moisture absorptive layer is formed using porous particles in lumps where a sorptive agent of an organic polymer type in fine particles is aggregated; and a method where a porous sorptive agent of an organic polymer type is firstly synthesized and then it is used for forming the moisture absorptive layer.

There is also no particular limitation for the surface shape of the moisture absorptive layer and any shape such as that which is flat, uneven or perforated may be adopted. However, as mentioned above, there are many cases where good result is achieved when the layer is made porous for enhancing the moisture absorbing property or, in other words, in a perforated shape. It is also possible to introduce unevenness on the surface to contribute in enhancement of property giving favorable result when a sorptive agent of an organic polymer type in particles is used and a moisture absorptive layer is formed in such a manner that each particle projects its head from the layer.

One of the characteristic features of the sorptive heat exchange module in which the sorptive agent of an organic polymer type according to the present invention is adopted is that it is now possible to desorb the adsorbed water at the temperature of lower than 100° C. and regenerate the module due to the characteristic feature of said sorptive agent of an organic polymer type. In the conventional sorptive agent of an inorganic type, its bond to water molecules is too strong whereby high temperature is needed for desorption and regeneration while, in the present heat exchange module, the same operation is able to be carried out with less energy and, therefore, its application as an apparatus and a system of a energy conservation type is possible. In addition, in the sorptive heat exchange module of the present invention, a sufficient regeneration is possible even at the regenerating temperature in a level of as low as lower than 70° C. or even at 40° C. or 50° C. provided that the condition is lower than the relative humidity upon the sorption. As a result of utilization of the characteristic features as such, waste heat of low temperature which has been discarded until now such as waste heat from factories, sunlight heat, waste heat from heat pump, waste heat from fuel cell and waste heat from hot water supply is now able to be utilized as a regenerated heat source whereby efficiency in utilization of energy can be raised. Incidentally, the temperature for the regeneration may be any of temperature of air acting for the regeneration and temperature of metal of the sorptive heat exchange module.

With regard to the metal by which a moisture absorptive layer comprising a sorptive agent of an organic polymer type is formed on the surface, it is to be a metal having excellent heat conductivity for enhancing the heat exchange. Examples thereof are silver, copper, gold, aluminum and steel and it is preferred that the thermal conductivity thereof is not less than 50 (W/m·K) since a highly efficient heat exchange is possible by that. Among them, in view of the price, aluminum, aluminum alloy, copper and copper alloy are more preferred for practical use.

There is no particular limitation for the shape of said metal but appropriate one may be selected depending upon the use applied. Examples of the shape are fin, tube, corrugated shape, punching metal, metal net and nonwoven metal fabric. The fin-shaped one is used most advantageously. Although there is also no particular limitation for its constitution, good results are often achieved when pitch of the fin is within a range of 0.5 mm to 5 mm and thickness of the fin is within a range of 0.03 to 0.5 mm. In the case of a crossed fin coil, it is preferred that the length from center to the end of the fin is 5 to 30 mm.

There is also no particular limitation for the surficial shape of said metal and an appropriate selection is possible from various shapes such as flat surface and uneven surface. However, the cases where surface is subjected to treatment for making into uneven or opening small pores thereon often gives good results for improving moisture absorptive and desorptive properties and heat exchange property and, particularly, for improving characteristics concerning speed thereof. There are also some cases of achieving a good result when particles, fiber, mesh, nonwoven fabric, etc. comprising a highly heat conductive substance are added onto the metal surface for the same purpose as above.

It is also possible to use such a thing where surface of said metal is treated, if necessary, with antifungal agent, coloring pigment, anti-corrosive pigment (such as that of chromate type, lead type, molybdic acid type and zinc type), anti-corrosive agent (such as a phenolic carboxylic acid, e.g. tannic acid and gallic acid and salt thereof and metal salt of organic phosphoric acid and biphosphoric acid, e.g. phytic acid and phosphinic acid and nitrite), etc.

The heat exchange module of a sorptive type according to the present invention is manufactured by forming a moisture absorptive layer comprising a sorptive agent of an organic polymer type as an essential component on the surface of metal having excellent thermal conductivity. Here, the term reading "forming a moisture absorptive layer" means that a moisture absorptive layer comprising a sorptive agent of an organic polymer type as an essential component is adhered onto the surface of the metal having excellent thermal conductivity.

One of the methods for the adhesion as such is that a substrate is coated with or impregnated with a solution containing a sorptive agent of an organic polymer type, an excessive solution is removed and the solvent, etc. are removed by heating and drying to form a moisture absorptive layer. The solvent for the solution containing the sorptive agent of an organic polymer type is water or an organic solvent and their mixture may be used as well. In the meanwhile, although there is no particular limitation for the shape of the sorptive agent of an organic polymer type used here, an emulsion is preferred in which the sorptive agent of an organic polymer type in fine particles is stably dispersed because uniform coating is possible by that. There is also no particular limitation for a method of coating the dispersion containing the sorptive agent of an organic polymer type but a commonly used method such as spraying, impregnation and electrodeposition coating may be utilized. Among them, a coating method by means of impregnation is excellent as a method where the solution is able to be applied to both surfaces at the same time and is able to be surely adhered on the whole substrate. There is also no particular limitation for removing an excessive solution and its examples are a method for removal using gravity by being allowed to stand, a method for shaking off by means of centrifugal force and a method for removal by the force of the wind.

There is no particular limitation for the strength of adhesion. However, in a common use of the sorptive heat exchange module, there are many cases where the use is done for long time continuously together with repetition of moisture absorption and desorption and there are also some cases where the adhered moisture absorptive layer comprising the sorptive agent of an organic polymer type as an essential component is exposed to water due to dew condensation or the like and it is preferred not to detach even under such a using state whereby function of moisture absorption and desorption is achieved. In view of such a respect, that which chemically bonds to metal, that which chemically bonds via some other compound, that by which sorptive agents of an organic polymer type are bonded each other or that in which the bonded one as such is chemically bonded on the surface of the metal is preferred over the case where the moisture absorptive layer comprising the sorptive agent of an organic polymer type as an essential component is merely physically adhered.

There is no particular limitation for a method where the sorptive agent of an organic polymer type is chemically bonded to metal and/or the sorptive agent of an organic polymer type but commonly used methods may be applied. Among them, a method where a cross-linking compound having two or more functional groups having a cross-linking property (including polymer) or, in other words, a cross-linking agent is used so as to bond chemically is preferred. Here, there is no particular limitation for the functional group having a cross-linking property and its examples are epoxy group, carboxyl group, hydroxyl group, methylol group, oxazoline group, amino group, aziridine group, isocyanate group and blocked isocyanate group. Among them, epoxy group, aziridine group and oxazoline group have high reactivity and are able to be easily handled whereby they are preferred.

Examples of the cross-linking compound having those groups are a polyepoxy compound such as diglycidyl ether, glycerol diglycidyl ether, glycerol triglycidyl ether, ethylene glycol diglycidyl ether, propylene glycol diglycidyl ether and polyethylene glycol diglycidyl ether; a glycol compound such as ethylene glycol, propylene glycol, polyethylene glycol and glycerol; a compound containing hydroxyl group(s) such as glycidyl alcohol, trimethylolpropane, polyvinyl alcohol and pentaerythritol; ethanolamine; ethylenediamine; propylenediamine; trimethylolmelamine; polyethyleneimine; urea; a reactive polymer of an oxazoline type; a blocked polyisocyanate compound; a polyaziridine compound; a compound containing polyoxazoline group; a titanium chelate compound; and a zirconia compound. When any cross-linking agent selected from the group consisting of polyepoxy compound, blocked polyisocyanate compound, polyaziridine compound, compound containing polyoxazoline group, titanium chelate compound and zirconia compound among the above is used, adhesion with excellent durability is possible and, therefore, it is particularly preferred to use them.

As to a cross-linking compound of other type, it is also possible to use a salt of multivalent metal such as magnesium, zinc, chromium and calcium. Those and the above-mentioned cross-linking compounds may be used either solely or jointly as a mixture of plural ones. Although there is no particular limitation for the using amount of those cross-linking compounds, since there are many ones which act in the direction of inhibiting the moisture absorbing and desorbing properties, it is preferred to use the amount of as little as possible.

Practically, it is appropriate to use 0.1 to 20.0% by weight or, more preferably, 1.0 to 10.0% by weight to the sorptive agent of an organic polymer type.

Another method for the adhesion is that a metal having excellent thermal conductivity is coated with or impregnated with a solution containing a monomer which is able to be converted to a sorptive agent of an organic polymer type by polymerization and then polymerization of said monomer is carried out so that a moisture absorptive layer where a sorptive agent of an organic polymer type is an essential component is formed on the surface of said metal. Examples of the monomer which is able to be converted to a sorptive agent of an organic polymer type by polymerization are the monomer which was mentioned in the illustration for a method of introducing a salt-type carboxyl group and the already-mentioned cross-linking agent.

There is no particular limitation for a method of polymerizing said monomer but commonly used polymerizing method may be used. Among them, a method using an initiator of a thermal decomposition type where heat in the step of conducting drying and heating after coating or impregnation is able to be effectively utilized, a method using an initiator of a redox type where polymerization is possible even at low temperature or a method using energy ray such as electron ray and ultraviolet ray gives good result.

Examples of the initiator of a thermal decomposition type are an initiator of a peracid type such as benzoyl peroxide, di-tert-butyl peroxide, diisopropyl peroxydicarbonate, 2,4-dichlorobenzoyl peroxide, lauroyl peroxide, cyclohexanone peroxide, tert-butyl perbenzoate, dicumyl peroxide, di-tert-butyl peroxide, p-menthane hydroperoxide, pinane hydroperoxide, cumene hydroperoxide, acetyl peroxide, potassium persulfate and ammonium persulfate; and an initiator of an azo type such as azobisisobutyronitrile, methyl azobisisobutyrate, azobis-2,4-dimethylvaleronitrile, azobiscyclohexane carbonitrile, azobisisobutylamidine hydrochloride and 4,4'-azobis-4-cyanovaleric acid.

Examples of the initiator of a redox type are combinations of cumene hydroperoxide or dialkyl peroxide with amine, polyamine, iron salt; hydrogen peroxide with ammonia, ethylamine, iron salt; potassium persulfate or ammonium persulfate with sodium sulfite, sodium hydrogen sulfite, triethanolamine, iron salt; sodium perchlorate with sodium sulfite; and cerium sulfate with alcohol, amine, starch.

In a method using energy ray such as electron ray or ultraviolet ray, commonly used sensitizers may be used. Examples thereof are a carbonyl compound such as acetone, biacetyl, benzyl, benzoin, benzanthrone, benzophenone, cyclohexanone and acetylacetone; a sulfur compound such as thiophenol, thiocresol, 2-mercaptobenzimidazole, mercaptobenzoxazole, mercaptobenzthiazole, methyl dithiocarbamate, diphenyl sulfide, diphenyl disulfide, dibenzoyl disulfide, dibenzthiazoyl disulfide, tetraalkylthiuram sulfide, tetraalkylthiuram disulfide, thioxanthone, 2-isopropyl thioxanthone and 2,4-diethyl thioxanthone; a halogen compound such as bromopropane, chlorocyclohexane and chloromethylnaphthalene; an amino compound such as triethylamine, diethylamine, diethanolamine, ethanolamine, dimethylaminobenzoic acid and methyl dimethylaminobenzoate; the already-mentioned peroxide or azobis compound; and a dye-type sensitizer such as rhodamine, erythrosine, acrylflavin, riboflavin, eosin, fluorescene, isocyan, pinacyanol halide and cryptocyanine. If necessary, the aforementioned initiator of a thermal decomposition type or initiator of a redox type may be also compounded.

It is also possible in the present method that fine particles of the sorptive agent of an organic polymer type are added to a solution containing a monomer which is able to be converted to a sorptive agent of an organic polymer type by polymerization so that a moisture absorptive layer containing the fine particles of the sorptive agent of an organic polymer type is formed on the metal surface whereby a product in which both moisture absorbing property and durability are high is able to be prepared giving a favorable result. Although there is no particular limitation for the ratio of the sorptive agent of an organic polymer type in the moisture absorptive layer prepared as such, there are many cases giving a good result when it is 70% or more as mentioned already.

In any of the above-mentioned method for formation, a porous substance may be added to the solution to be coated with an object of increasing the speed of absorption and desorption of moisture. With regard to the porous substance as such, commonly used ones may be used and, in the case of an inorganic type, examples thereof are active carbon, carbon black, graphite, carbon fiber, foamed glassy carbon, charcoal, coal, silicon carbide, silica gel, alumina, clay-type porous substance, porous glass, porous porcelain, sintered metal, alundum, foamed concrete, pearlite, vermiculite, shirasu (a type of light gray volcanic ash), magnesia, glass fiber and ceramic fiber. Examples of organic type ones are a spongy or foamy one comprising a material such as polystyrene, polyvinyl chloride, polyethylene, polypropylene, polyvinyl alcohol, polyurethane, polyphenol, polyurea, polyepoxy, natural rubber, neoprene, neoprene-butylene rubber, styrene-butadiene-rubber, silicone resin, polyester and acrylic resin; sintered product comprising polyacrylonitrile, acrylic resin, polystyrene and polyphenylene oxide; and natural porous polymer such as wood, straw, hemp palm and sponge. Among them, silica gel, zeolite, active carbon, etc. have various types in size, particle diameter, porosity, small pores, etc. and are in high adaptability whereby they are advantageous.

In any of the above methods, it is possible to add an additive thereto upon necessity within such an extent that the characteristic feature of moisture absorption and desorption which is an object of the present invention is not greatly lowered and various kinds of thermal polymerization suppressor, leveling agent, thickener, viscosity reducing agent, thixotropy giving agent, halation inhibitor, delustering agent, coloring pigment, diluent, filler, enhancer, thermoplastic resin, etc. may be appropriately selected and used.

From a viewpoint of increasing the thermal conductivity, it is possible to improve the efficiency of heat exchange by addition of a substance having good thermal conductivity to a solution for coating. Examples of such an additive are graphite, silicon carbide and fiber of metal such as copper or aluminum.

Further, if necessary, a substance which acts as a binder may be added so that bonding of the sorptive agent of an organic polymer type or the sorptive agent layer to metal is made stronger. Examples of an organic one are melamine resin, urea resin, phenol resin, epoxy resin, polyvinyl alcohol, polyvinyl acetate, acrylic resin, polyacrylic acid, polymethacrylic acid and urethane resin while examples of an inorganic one are silicate and colloidal silica. With regard to the adding amount thereof, any amount by which the aimed characteristics are able to be achieved may be freely set and, since many of them tend to act in the direction of lowering the moisture absorbing and desorbing property, it is preferred to be as small as possible. To be more specific, the case where it is not more than 30% by weight to the total weight of the moisture absorptive layer is preferred. More preferably, it is not more than 20% by weight.

Similarly, the metal may be subjected to a surface treatment if necessary so that the bonding of the sorptive agent of an organic polymer type or the sorptive agent layer to metal is made stronger. Specific examples thereof are a degreasing treatment such as washing with alkali, washing with acid, washing with degreasing chemical solution and washing with organic solvent so as to remove oil and dirt adhered on the metal plate, a treatment with a silane coupling agent, a treatment with a titanate coupling agent and a treatment with an aluminate coupling agent.

There is no particular limitation for amount and thickness of the moisture absorptive layer formed on the metal surface by the above-mentioned treatment and it may be freely set so as to achieve the desired characteristics depending upon the particular use. However, when the coated amount is too much, there may be some cases where the problems that thickness of the moisture absorptive layer becomes too large and water vapor does not move into the inner area of the moisture absorptive layer whereby no sufficient characteristic is achieved are resulted. On the other hand, when the amount is too small, there is a problem that no sufficient moisture absorbing and desorbing properties are available. In view of the above, preferred amount and thickness of the moisture absorptive layer are 1 to 100 g/m$^2$ and 1 to 100 μm, respectively. Incidentally, the metal surface on which the moisture absorptive layer is formed may be either both surfaces or one surface of the metal.

There is also no particular limitation for drying which is carried out for forming the moisture absorptive layer in the above but commonly used means such as drying with hot air, drying with infrared ray and drying with high frequency heating may be appropriately selected and used. With regard to heating temperature and time for the drying, any condition for removal of the solvent may be freely set. For example, a condition where drying temperature is from room temperature to 200° C. and drying time is from 10 seconds to 24 hours may be adopted.

Depending upon the method of use, there may be the cases where water drops due to dew condensation adhere to or water such as rain water acts on the sorptive heat exchange module of the present invention but, since metal and moisture absorptive layer tightly adhere by the above-mentioned method, the module has an excellent resistance to water as well. As to an index for the water resistance, a change in weight when the sorptive heat exchange module of the present invention is exposed to running water for one hour or, in other words, a detached rate of the moisture absorptive layer is preferred to be less than 30% by weight. When it is less than 30% by weight, reduction in the moisture absorbing property is not big even when the sorptive agent is detached and there are many cases where there is no practical problem. Preferably, it is less than 20% by weight.

EXAMPLES

As hereunder, the present invention will be more specifically illustrated by way of the Examples although the present invention is not limited to those Examples only. Incidentally, the terms "part(s)" and percentage in the Examples are those by weight unless otherwise mentioned. Now, evaluation method for each characteristic and way of expressing the evaluated result will be illustrated.

A saturated moisture absorbing rate of the moisture absorptive layer is a value obtained by the following method. Thus, a moisture absorptive layer is formed by the same method as in Example on a metal plate [WMe(g)] for which the weight was measured previously is used as a specimen for measurement. Said metal plate is dried using a hot-air drier at 105° C. for 16 hours and the weight is measured [Wds(g)].

After that, the specimen is allowed to stand for 24 hours in a container of constant temperature and humidity adjusted at 20° C. temperature and 65% RH or 90% RH and weight of the specimen which absorbed the moisture is measured [Wws (g)]. From the above result, a saturated moisture absorbing rate is calculated by the following formula.

Saturated moisture absorbing rate (% by weight)= $\{(Wws-Wds)/(Wds-WMe)\}\times 100$ Water absorbing multiplication factor of the moisture absorptive layer is calculated in such a manner that the metal plate on which the moisture absorptive layer is formed by the same method as in the above-mentioned measurement of saturated moisture absorbing rate is dried at 105° C. for 16 hours, weighed [W1s (g)], gently dipped in water, allowed to stand in water for 1 hour and drained after 1 hour and weighed [W2s (g)]. On the basis of the above results, a water absorbing multiplication factor is calculated by the following formula.

Water absorbing multiplication factor= $\{(W2s-W1s)/(W1s-WMe)\}\times 100$

With regard to an average particle diameter of the sorptive agent of an organic polymer type in fine particles, the result measured by a particle size distribution measuring apparatus of a laser diffraction type manufactured by Shimadzu (SALD 2000) where water was used as a dispersing medium was expressed on the basis of volume and a median diameter was adopted as an average particle diameter. In the case of particles in a state where fine particles of a polymer type sorptive agent are aggregated, an average particle diameter of primary particles was calculated in such a manner that said particles were observed under an electron microscope, particle diameter of 100 primary particles was measured from the photograph and an average value was calculated therefrom.

With regard to the amount of carboxyl group of a salt type, 1 g of a well-dried specimen was precisely weighed (X g), 200 ml of water was added thereto, the mixture was adjusted to pH 2 by addition of 1N aqueous solution of hydrochloric acid together with heating at 50° C. so that all carboxyl group contained in the specimen was made those of an H-type and then a titration curve was determined by a conventional method using 0.1N aqueous solution of NaOH. From said titration curve, amount of the aqueous solution of NaOH consumed for an H-type carboxyl group was determined (Y ml) and total amount of carboxyl group contained in the specimen was calculated by the following formula.

Total amount of carboxyl group (meq/g)=0.1$Y/X$

In the meanwhile, another titration curve was similarly prepared without adjusting to pH 2 by addition of 1N aqueous solution of hydrochloric acid during the above operation of measurement of total carboxyl group and the amount of the H-type carboxyl group contained in the specimen was calculated. From those results, amount of the salt-type carboxyl group was calculated by the following formula.

Amount of salt-type carboxyl group (meq/g)=(total amount of carboxyl group)−(amount of $H$-type carboxyl group)

With regard to the amount of sulfonic acid group, the numerals mentioned in the technical reference of the ion-exchange resin used were applied.

A detached rate with running water which is an index expressing the water resistance of adhesion of the moisture absorptive layer comprising the sorptive agent of an organic polymer type to metal is measured as follows. Thus, a metal plate in a size of 9 cm×21 cm to which a moisture absorptive layer is coated by the same method as in the above measurement of saturated moisture absorbing rate is dried at 105° C. for 30 minutes and the weight after drying is measured. After that, said metal plate is hung in a 10-liter container which is fully filled with water and water is flown into said container for 1 hour at the rate of 2 liters/minute so as to make it overflowed whereby the metal plate is exposed to running water. After 1 hour, the metal plate which was treated with running water is dried under the condition of 105° C. for 30 minutes and its weight is measured. Percentage of a value prepared by dividing the difference between the weighs before and after the treatment by the weight before the treatment is adopted as the detached rate with running water. This value is a numeral showing the water resistance of the heat exchange module of a sorptive type and it is judged that the less the value, the higher the water resistance.

After that, the heat exchange module as shown in FIG. 1 was degreased by means of an alkali washing solution and then dipped in a solution where said sorptive agent was dispersed, an excessive solution was shaken off by a centrifugal method and the module was dried for 16 hours in a hot-air drier 120° C. to give a heat exchanger module of a sorptive type according to the present invention. Characteristics of the resulting module are shown in table 1 and, although saturated moisture absorbing rate and difference in absorption and desorption rates of moisture (i.e. difference in saturated moisture absorbing rates at 20° C. and 90% RH and 65% RH, respectively) were within a level which is able to be used practically, properties were not high.

TABLE 1

|  | Unit | Ex. 1 | Ex. 2 | Ex. 3 | Ex. 4 |
|---|---|---|---|---|---|
| Saturated Moisture Absorbing Rate |  |  |  |  |  |
| 20° C. × 65% RH | % | 20 | 34 | 54 | 38 |
| 20° C. × 90% RH | % | 42 | 64 | 113 | 84 |
| Difference in Absorption and Desorption Rates of Moisture | % | 22 | 30 | 59 | 46 |
| Type of Polar Group |  | H-type sulfonic group | Na-type carboxylic acid group | K-type carboxylic acid group | Na-type carboxylic add group |
| Amount of Polar Group | meq/g | 4.4 | 5.5 | 6.8 | 8.9 |
| Water Absorption Multiplication Factor | fold | 0.5 | 1.8 | 2.3 | 9.2 |
| Rate of Sorptive Agent of Polymer Type | % | 74 | 76 | 100 | 100 |
| Detachment Rate | % | 6 | 9 | 2 | 27 |

Example 1

As a sorptive agent comprising an organic polymer having hydrophilic polar group and cross-linking structure in a molecule, Amberlite IR120B which is an ion-exchange resin manufactured by Organo was used. Since average particle diameter of said sorptive agent was as big as 0.5 mm, said particles were firstly dried and then ground using a gas stream atomizer to give fine powder of sorptive agent of a polymer type where average particle diameter as a primary particle was 4 µm.

Ethylene glycol monobutyl ether (406 parts) was charged in a four-necked flask equipped with thermometer, dropping funnel and stirrer and heated at 100° C. in a nitrogen stream, then a mixture of 196 parts of acrylic acid, 49 parts of 2-hydroxyethyl acrylate, 35 parts of ethylene glycol monobutyl ether and 14 parts of 2,2'-azobisisobutyronitilre was dropped thereinto from a dropping funnel during 3 hours at that temperature and then the mixture was stirred at the same temperature for 2 hours more after the dropping followed by cooling to give an acrylic resin solution where solid amount was 35%. The resulting resin (as a solid) had a resin acid value of 623 mg KOH/g and a weight-average molecular weight of 25,000. Water was gradually added to the resulting 35% acrylic resin solution followed by stirring to give an aqueous solution of acrylic resin where solid amount was 13%.

To 800 parts of deionized water were added 200 parts of the above-prepared aqueous solution of acrylic resin, 100 parts of the above pulverized fine particles of polymer-type sorptive agent and 10 parts of ethylene glycol diglycidyl ether followed by strong stirring to give a solution in which the sorptive comprising the organic polymer was dispersed.

Example 2

Water (1,081 parts) was placed in a two-liter polymerization tank, temperature was raised up to 60° C. and 6.2 parts of sodium pyrosulfite was added as a reducing agent. After that, each of a solution of a monomer mixture of 450 parts of acrylonitrile and 50 parts of methyl acrylate and an aqueous solution of oxidizing agent where 5 parts of ammonium persulfate was dissolved in 100 parts of water was dropped thereinto during 2 hours to conduct polymerization, then temperature was raised up to 80° C. and an after-polymerization was carried out for 2 hours. After completion of the reaction, temperature was lowered down to room temperature together with stirring to give a dispersion of porous acrylonitrile-type polymer which is an aggregate where an average particle diameter was 42 µm. When the primary particles of the aggregate were observed under an electron microscope, its average particle diameter was 0.3 µm.

After that, 100 parts of the resulting polymer was mixed with 50 parts of 60% by weight hydrazine and 850 parts of water, cross-link was introduced thereinto by conducting a hydrazine treatment at 90° C. for 3 hours, 100 parts of sodium hydroxide was added thereto and reaction was carried out at 120° C. for 5 hours so that the residual nitrile group was hydrolyzed to convert into carboxylic acid group (sodium type upon the stage of completion of the hydrolysis) to give a porous sorptive agent of an organic polymer type. Average particle diameter of the resulting sorptive agent of an organic polymer type in an aggregated form was 51 µm, an average particle diameter of the primary particles thereof was 0.4 µm, amount of a salt-type carboxyl group was 7.2 meq/g and specific surface area and average pore diameter were 4.3 m²/g and 0.4 µm, respectively. Then said sorptive agent of an organic polymer type in an aggregated form was dried and pulverized into an average particle diameter of 3 µm using a gas stream atomizer to give a sorptive agent of an organic polymer type which was porous and in fine particles.

To 800 parts of deionized water were added 150 parts of aqueous solution of acrylic resin prepared in Example 1, 100 parts of the above-pulverized porous fine particles of sorptive agent of an organic polymer type, 30 parts of Epocros 2000 (solid content: 40% by weight) which is a polymer containing oxazoline group manufactured by Nippon Shokubai and 5 parts of ammonium carbonate as a foaming agent and the mixture was strongly stirred to give a solution where a sorptive agent comprising the organic polymer was dispersed.

Then a heat exchange module as shown in FIG. 1 was degreased using an alkali washing solution, dipped in said solution in which the sorptive agent was dispersed, an excessive solution was shaken off by a centrifugal method and drying was conducted in a hot-air drier of 120° C. for 16 hours to give a heat exchanger module of a sorptive type having a porous structure according to the present invention. Characteristics of the resulting module are shown in Table 1 and excellent moisture absorbing and desorbing properties were confirmed. When a part of the resulting moisture absorptive layer was peeled off and specific surface area and average pore diameter were measured and found to be 5.1 $m^2/g$ and 0.2 μm, respectively whereby preparation of porous moisture absorptive layer was confirmed.

Example 3

Sodium lauryl sulfate (1 part), 3 parts of ammonium persulfate and 350 parts of deionized water were charged in a reactor. Then the reactor was raised up to 70° C. temperature and 35 parts of methyl acrylate (referred to as MA), 40 parts of butyl acrylate, 15 parts of divinylbenzene, 5 parts of methacrylic acid, 5 parts of sodium p-styrenesulfonate, 3 parts of polyethylene glycol (23 mol) monoacrylate and 50 parts of deionized water were dropped into the reactor together with stirring at 70° C. to start the polymerization. The dropping speed was adjusted so that dropping of those monomers finished within 30 minutes. After finishing the dropping, the mixture was kept at the same condition for 2 hours to conduct the polymerization. The polymer emulsion prepared as such contained 21% solid and its average particle diameter was as very fine as 0.03 μm.

To 480 parts of the resulting polymer emulsion was added a solution where 45 parts of potassium hydroxide was dissolved in 475 parts of deionized water and the mixture was further subjected to a hydrolyzing reaction at 95° C. for 48 hours and then for 8 hours more under a refluxing condition. The mixed solution after hydrolysis was placed in a cellulose semipermeable membrane and desalted by dipping in deionized water to give a sorptive agent of an organic polymer type in a form of emulsion by means of a method where carboxylic acid group was introduced by hydrolysis of ester. Solid amount of the resulting emulsion was 12% and, when particle diameter of the sorptive agent of an organic polymer type was measured, the average particle diameter was as very small as 0.04 μm.

To 300 parts of the resulting sorptive agent of an organic polymer type in a form of emulsion were added 10 parts of acrylic acid, 5 parts of Chemitite DZ (manufactured by Nippon Shokubai) which is a cross-linking diaziridine compound and 0.5 parts of ammonium persulfate as an initiator followed by mixing and stirring to give a solution containing a sorptive agent of an organic polymer type and monomer which is able to be converted to a sorptive agent of an organic polymer type by means of polymerization. After that, said solution where the sorptive agent was dispersed was passed only through a corrugate molded aluminum plate layer (6) for conducting latent heat exchange and moisture absorption and desorption of the heat exchange module as shown in FIG. 2, an excessive solution was blown off by compressed air and heated and dried for 16 hours in a hot air drier of 120° C. to give the sorptive heat exchanger module of the present invention comprising a moisture absorptive layer containing the sorptive agent of an organic polymer type of a particle form in a filmy sorptive agent of an organic polymer type. Characteristics of the resulting module are as shown in Table 1 and very excellent moisture absorbing and desorptive properties and water resistance were able to be confirmed. It is likely that such a good result is achieved due to very small particle diameter of the fine particles of sorptive agent of an organic polymer type.

Test for confirmation of regeneration at low temperature was carried out using the sorptive heat exchanger module prepared in Example 3. The experiment was conducted in such a manner that said module was allowed to stand for one night under the condition of 20° C.×90% RH (absolute humidity was about 13 g/kg-DA) so the moisture was well absorbed, then air of 50° C.×18% RH (absolute humidity was about 13 g/kg-DA) having the same absolute humidity was sent to the moisture absorptive and desorptive layer at a face velocity of 2 m/s, state of moisture desorption was confirmed by means of changes in weight and the fact whether regeneration was possible was confirmed. As a result, moisture content (fraction by weight of moisture contained per dried moisture absorptive layer weight) only for a moisture absorptive layer of said module after sending the said regeneration air for one hour lowered to an extent of 14%. Since the moisture absorbing rate at 20° C.×90% RH was 113%, moisture content of the moisture absorptive layer after the initial moisture absorption was 113%. Accordingly, since the moisture contained therein lowered from 113% to 14% as a result of the above-mentioned test, 0.99 g of moisture per 1 g of dry weight of the moisture absorptive layer was desorbed from the moisture absorptive layer whereupon the moisture absorptive layer was regenerated. From this result, it was confirmed that, even at the temperature of as low as 50° C., the sorptive heat exchange module of the present invention was well able to be regenerated.

The sorptive agent of an organic polymer type in a form of emulsion prepared in Example 3 was coated to paper of 25 $g/m^2$ and dried to give paper to which 30 $g/m^2$ of the sorptive agent of an organic polymer type was adhered. Antibacterial property against *Staphylococcus aureus* was evaluated using the paper according to a quantitative test of JIS L 1902 and, as a result, antibacterial property of as high as 2.0 and 4.8 in terms of bactericidal activity and bacteriostatic activity respectively was confirmed. In addition, the same paper sample was used and resistance to fungi was evaluated by means of a dry method according to JIS Z 2911.6.2.1 and, as a result, no growth of mycelia was noted on the test piece both after two weeks and four weeks whereby the present sorptive agent was confirmed to have a high antifungal property.

Example 4

Sodium acrylate (50 parts) was dissolved in 1,000 parts of water and 5 parts of tetraethylene glycol dimethacrylate and 5 parts of ethylene glycol diglycidyl ether as cross-linking agents and 2 parts of ammonium persulfate as an initiator were added thereto to give a solution containing a monomer which is able to be converted to a sorptive agent of an organic polymer type by means of polymerization.

The heat exchange module shown in FIG. 3 was subjected to a degreasing treatment by washing with alkali and then methacryloxypropyl trimethoxysilane was coated to conduct a silane coupling treatment. The resulting module after the treatment was dipped in the above-mentioned solution containing a monomer and an excessive solution was removed by a centrifugal method. After that, heating and drying treatment was carried out for 1 hour using a hot-air drier of 105° C. and for more 16 hours at 120° C. whereupon the sorptive heat exchanger module of the present invention comprising a moisture absorptive layer of filmy sorptive agent of an organic polymer type was able to be prepared. Characteristics of the resulting module are shown in Table 1 and, although the moisture absorbing and desorbing properties were high and there is no actual problem, the resulting state was that the expression of moisture absorbing rate was low as compared with the amount of carboxylic acid group and further that water absorbing multiplication factor and resistance to water were nearly at the practical limit.

The invention claimed is:

1. A heat exchange module of a sorptive type, characterized in that a moisture absorptive layer is formed on a metal surface having excellent heat conductivity, and characterized further in that the moisture absorptive layer has (a) a sorptive agent of an organic polymer type in the form of fine particles comprising organic polymer having hydrophilic polar group and cross-linking structure in a molecule is an essential component, (b) saturated moisture absorbing rates at 20° C. and 65% RH and 90% RH which are not less than 20% by weight and not less than 40% by weight, respectively, and the difference in the saturated moisture absorbing rates under such a condition is not less than 20% by weight, and (c) a porous structure which has a specific surface area of not less than 1 $m^2/g$ and an average pore diameter of 0.005 to 5.0 μm.

2. The heat exchange module of a sorptive type according to claim 1, wherein the sorptive agent of an organic polymer type contains 1.0 to 10.0 meq/g of carboxyl group of a salt type as the hydrophilic polar group contained in a molecule, has an antibacterial and/or an antifungal property/properties and water absorbing multiplication factor of the moisture absorptive layer where said sorptive agent of an organic polymer type is an essential component is not more than 10-fold.

3. The heat exchange module of a sorptive type according to claim 2, wherein the salt of the carboxyl group of a salt type is a potassium type.

4. The heat exchange module of a sorptive type according to claim 1, wherein primary particles of the fine particles of the sorptive agent of an organic polymer type have an average particle diameter that is smaller than 5 μm.

5. The heat exchange module of a sorptive type according to claim 1, wherein the content of a sorptive agent of an organic polymer type in the moisture absorptive layer is not less than 70% by weight.

6. The heat exchange module of a sorptive type according to claim 1, wherein the moisture absorptive layer is able to be regenerated at the temperature of lower than 100° C.

7. The heat exchange module of a sorptive type according to claim 1, wherein the metal having excellent heat conductivity is any of aluminum, copper, aluminum alloy and copper alloy.

8. The heat exchange module of a sorptive type according to claim 1, wherein the moisture absorptive layer where a sorptive agent of an organic polymer type is an essential component is prepared by means of cross-linking using any of a cross-linking agent selected from a group consisting of melamine resin, urea resin, phenol resin, polyepoxy resin, blocked polyisocyanate compound, aziridine compound, compound containing a polyoxazoline group, titanium chelate compound and zirconia compound.

9. The heat exchange module of a sorptive type according to claim 1, wherein the metal having excellent heat conductivity has been treated with a silane coupling agent or a titanate coupling agent.

10. A method for the manufacture of a heat exchange module of a sorptive type according to claim 1, characterized in that, a metal having excellent thermal conductivity is coated with or impregnated with a solution containing a sorptive agent of an organic polymer type in the form of fine particles and heated and dried after an excessive solution is removed whereby a moisture absorptive layer is formed on the surface of said metal.

* * * * *